3,152,682
CONVEYOR FOR SELECTIVE DISPATCHING OF ARTICLES

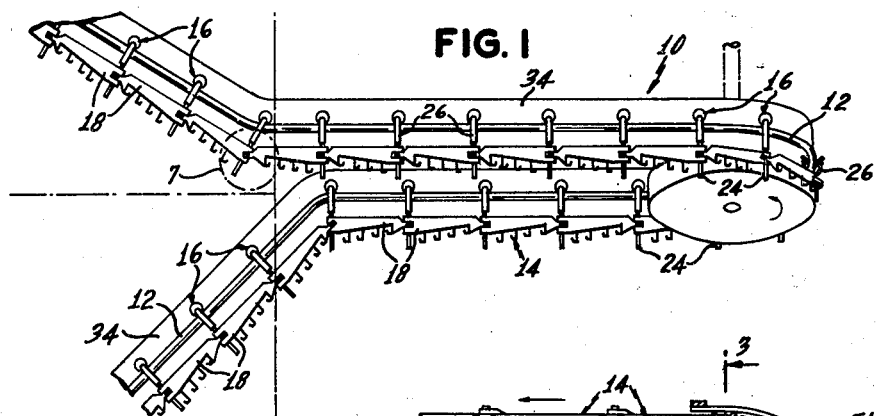
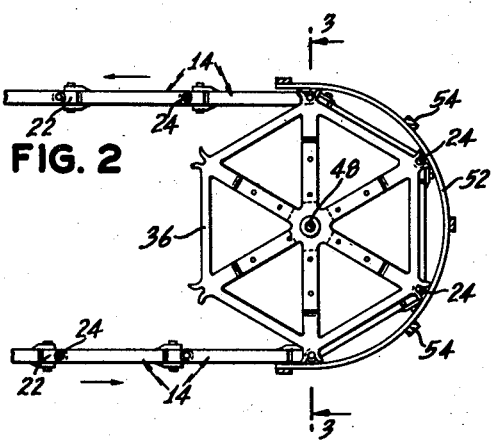
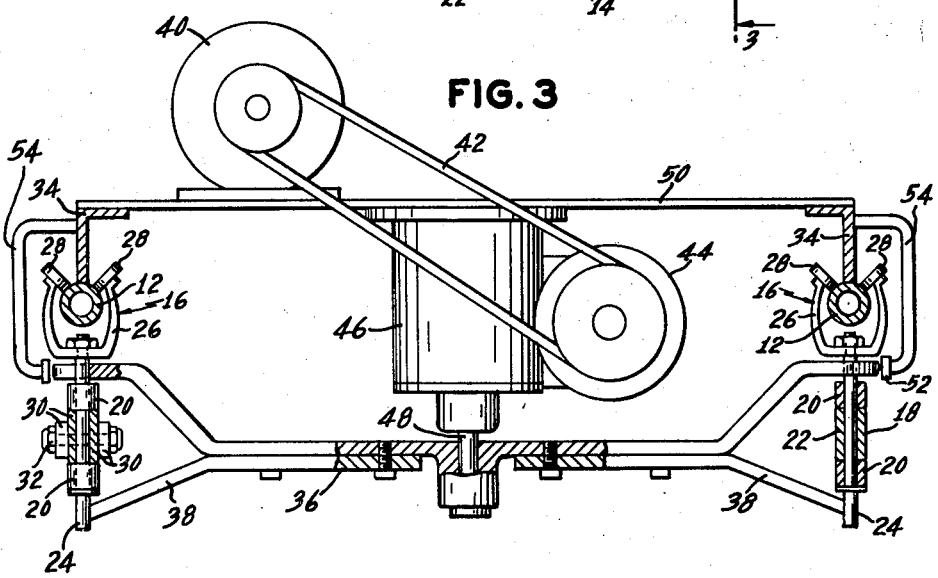
INVENTORS
ABRAHAM RUTKOVSKY
SAM RUTKOVSKY
ATTORNEYS Oct. 13, 1964    A. RUTKOVSKY ETAL    3,152,682
CONVEYOR FOR SELECTIVE DISPATCHING OF ARTICLES
Original Filed April 5, 1961    2 Sheets-Sheet 2
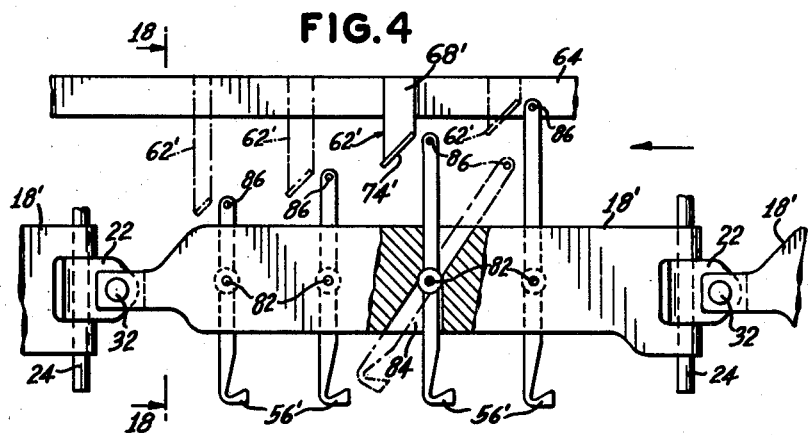
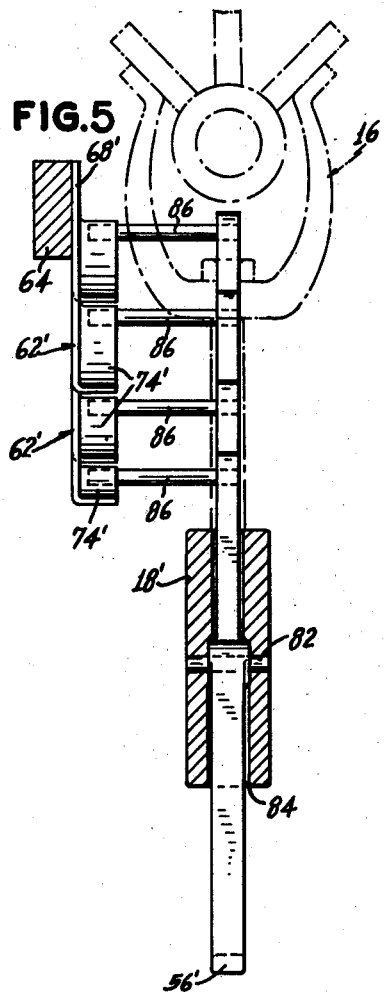
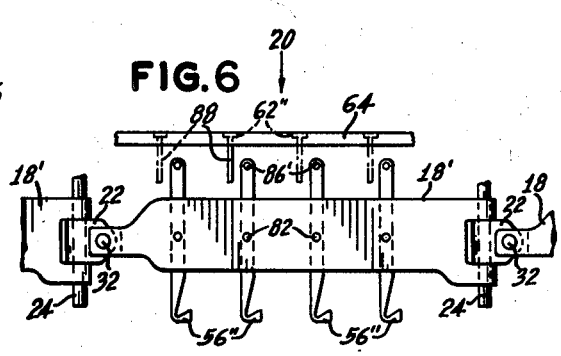
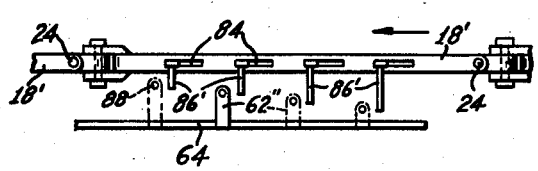
*INVENTORS*
ABRAHAM RUTKOVSKY
SAM RUTKOVSKY
BY
*Felchin and Rosen*
ATTORNEYS

Abraham Rutkovsky and Sam Rutkovsky, Brooklyn, N.Y., assignors to Railex Corporation, Ozone Park, N.Y., a corporation of New York
Original application Apr. 5, 1961, Ser. No. 100,866, now Patent No. 3,118,531, dated Jan. 21, 1964. Divided and this application Jan. 21, 1963, Ser. No. 252,919
9 Claims. (Cl. 198—38)

This invention relates to conveyors for delivering various classifications of articles to preselected locations.

One of the objects of the present invention is to provide a conveyor having an article supporting means movable along a rail with means for selectively removing different articles from the conveyor at preselected positions along the path of travel of the conveyor.

A further object is to provision of a conveyor wherein each link of the conveyor chain is provided with a series of article carrying members positioned at various levels and means are provided in the path of movement of the conveyor chain at levels corresponding to the levels of the article carrying members, respectively, for removing articles carried thereby.

Another object is the provision of a conveyor wherein each link of the conveyor chain is provided with a series of pivoted article carrying members and means are provided in the path of movement of said members to cause pivotal movement of the members to thereby remove the articles carried by said members.

A further object is the provision of a conveyor with article removing means which may be operated to remove any one of a plurality of classifications of articles from the conveyor at a particular position along the path of travel of the conveyor.

The above and other objects, features and advantages of the invention will be more fully understood from the following description of the invention considered in connection with the accompanying illustrative drawings.

In the drawings:

FIG. 1 is a perspective view, partly diagrammatic, of the driven end of the conveyor;

FIG. 2 is a top plan view of the driven end of the conveyor;

FIG. 3 is a sectional view, on a larger scale, taken on line 3—3 of FIG. 2;

FIG. 4 is a side elevational view of part of a conveyor in accordance with another embodiment of the invention;

FIG. 5 is a sectional view, on a larger scale, taken on line 18—18 of FIG. 4;

FIG. 6 is a side elevational view of part of a conveyor in accordance with still another embodiment of the invention; and FIG. 7 is a top plan view of the part of the conveyor shown in FIG. 6.

Referring now to the drawings in detail and particularly to FIGS. 1 to 3, the conveyor 10 comprises an endless rail 12 and an endless conveyor chain 14 which is suspended below the rail and is mounted for movement along the rail by the trolleys 16. The conveyor chain comprises a series of rigid links 18 which are disposed in end-to-end relation and adjacent ends of adjacent links are pivotally connected to each other to permit relative movement of the links with respect to each other in both horizontal and vertical planes. More particularly, one end of each link is provided with the bifurcated parts 20 and a pivot member 22 is positioned between the parts. A pivot pin 24 extends through parts 20 and member 22 and the upper end of the pin has a Y-shaped bracket 26 mounted for rotational movement thereon. The upper ends of the arms of the bracket carry the rollers 28 of the trolley which are in rolling engagement with the upper surface of the rail 12. The opposite end of each link is provided with the forked parts 30 and the pivot member 22 is positioned between said forked parts. A horizontal pivot pin 32 pivotally connects the forked parts to member 22 to complete the connection between adjacent links which permits universal movement of the links with respect to each other.

As indicated in FIG. 1, the conveyor chain has horizontal portions as well as inclined portions and it will be understood that the conveyor is able to transport articles suspended from the links of the chain to any location along the path of travel of the conveyor chain and these locations may be at different levels. The universal connection between adjacent links permits movement of the conveyor chain along a path which may have straight portions as well as curved portions and various portions of the path may be at different levels, as may be provided in a dry cleaning and laundry establishment, for example.

The rail 12 may be supported from floor stanchions or may be suspended from the ceiling by supports which are secured to the frame 34 of the conveyor. The drive for the conveyor chain comprises a sprocket wheel 36 whose teeth engage the upper part of the pivot pins 24, as said pins pass the position of the sprocket wheel, to drive the sprocket chain. The spokes of the sprocket wheel are provided with members 38 which engage the lower end of the pivot pins during their driving engagement with the teeth of the sprocket wheel and help maintain said pins in a vertical position since the pins have a tendency to tilt because of the pull of the downwardly inclined portions of the conveyor on the engaged pivot pins. The sprocket wheel is driven by a motor 40 which is connected by belt 42 to the pulley 44 of a speed reduction gear 46. The output shaft 48 of the reduction gear is keyed to the sprocket wheel and the sprocket wheel and its drive is supported on the frame 34 by the supporting plate 50.

As best seen in FIGS. 2 and 3, the pivot pins which are in driving engagement with the teeth of the sprocket wheel are prevented from jumping out of the recesses formed by the sides of the teeth and thereby becoming disengaged from said teeth, by the curved plate 52 whose inner surface is adjacent to the open ends of the sprocket teeth and only slightly spaced therefrom to cover the recesses. Plate 52 is supported from the frame 34 of the conveyor by the straps 54. In this manner, the tendency of the pivot pins to jump through the open ends of the teeth because of the forces exerted on the pins due to the inclined parts of the conveyor and other factors is prevented.

Each link of the chain is provided with a series of article supporting members 56', 56" of hook-like configuration. Members 56', 56" are spaced from each other longitudinally of the link and the members of each link are in longitudinal alignment. Although four article supporting members are shown herein for each link, it will be understood that any number of members may be provided on each link. The articles, which may be garments or laundry of various kinds, are suspended from members 56' and 56" by hooks although it will be understood that closed rings may also be used to support the articles from members 56' and 56".

The article supporting members of each link are each adapted to carry a different classification of articles. For example, one member may carry trousers, another may carry laundry, the third may carry dresses and the last coats. In accordance with the invention, these various classifications of articles are delivered by the conveyor to various preselected locations along the path of travel of the conveyor and are automatically discharged from the conveyor at the particular preselected location for that classification of articles. To accomplish this, a pusher 62', 62" is positioned along the path of travel of the conveyor chain at a location where a particular classification of articles is to be delivered. The number of pushers provided is the same as the number of article supporting members 56', 56" on a link and it will be understood that the pushers are spaced from each other longitudinally along the path of travel of the conveyor chain and that a pusher is positioned at each location where a particular classification of articles is to be removed from the conveyor.

Each pusher is supported from the frame 34 of the conveyor by a bracket 64. Pusher 62' may comprise a vertical part 68' which is secured at its upper end to the bracket 64.

While the function of members 56' and 56" have been described above as being utilized for delivering different classifications of articles to different preselected locations along the path of travel of the conveyor, it will be understood that said members may also be used to deliver the same classification of articles but to deliver these articles to different locations along the path of travel of the conveyor. In such a case, the articles which are to be removed from the conveyor at the first preselected location are carried by the same members of each link of the chain and the articles which are to be removed from the conveyor at the second location along the path of travel of the conveyor are carried by other members of each link of the chain. Still other members of each link of the chain carry articles which are to be delivered to the third position and the remaining members of each link of the chain carry articles which are to be delivered to the fourth position along the path of travel of the conveyor and if additional positions of delivery are required, additional article supporting members would be provided on each link of the chain so that the number of members provided on each link of the chain would be the same as the number of delivery locations. It will be understood that this is similarly true in the case of different classifications of goods wherein the number of members provided in each link of the chain corresponds to the number of different classifications of articles. Also, it will be understood that a combination of the foregoing can be effected. For example, as illustrated herein there are four article carrying members provided on each link of the chain and these members may carry only two classifications so that the same classification of articles can be discharged at two different locations and the other classification of articles can also be discharged at two other and different locations.

Referring now to FIGS. 4 to 7, there are shown other embodiments of the invention wherein the article carrying members 56' and 56" are pivoted to each link 18' of the chain instead of being rigidly fixed thereto, as shown in U.S. Patent No. 3,118,531 issued January 21, 1964. The pivot connection for each member is indicated at 82 and the link is provided with slots 84 to permit the pivotal movement of the members in their respective links. Referring first to FIGS. 4 and 5, each member 56' is provided with a horizontally extending pin 86 at its upper end and the levels of the pins rise in a direction from left to right, as viewed in FIG. 4, which is opposite to the direction of movement of the conveyor chain. Each pin is of the same length and is adapted to engage a pusher 62' which is positioned along the path of travel of the conveyor at a level corresponding to the level of the pin of a corresponding member 56' of each link of the chain. It will be understood that the pushers 62' are spaced from each other along the path of travel of the conveyor chain and the pushers illustrated in dotted lines in FIG. 4 are not actually next to each other, as shown, but are spaced from each other along the path of travel of the conveyor.

As the conveyor chain moves from right to left, as viewed in FIG. 4, the pin 86 engages a corresponding pusher which is at the same level as the pin and causes the corresponding member 56' to rotate in a clockwise direction, as viewed in FIG. 4, which causes the hook of the article to fall off member 56'. As seen in FIG. 5, the pins 86 do not engage the vertical part 68' of the pusher and are only engaged by the slanting cam edge 74' of the pusher so that it is not necessary to place the highest level pusher at the first delivery position along the path of travel of the conveyor because the pins only engage the pusher which is at the same level as the pin.

In FIGS. 6 and 7, the article carrying members 56" have pins 86' which are at the same level but are of varying lengths, as shown. The pushers 62" have pine engaging parts 88 which are at different distances from the members 56" transversely of the path of movement of the conveyor chain. Accordingly, as a pin 86' passes a corresponding pusher, the member 56" is caused to rotate about its pivot to release the articles carried thereby. It will be observed that in this embodiment of the invention, the articles which are to be removed first are placed on the member of each link of the conveyor which has the longest pin 86', since the other members 56" of each link of the chain have shorter pins which freely pass the pusher which actuates the longest pin. As the previously actuated longer pin passes by a pusher for a shorter pin, said longer pin is again actuated but since it has previously been actuated and has released its articles, the subsequent actuation of the longer pin does not matter. As illustrated with respect to the previous embodiments of the invention, the dot-dash lines illustrating the pushers 62" are utilized to indicate that these pushers are not next to each other as shown, but are spaced from each other along the path of travel of the conveyor.

As more fully described in the above mentioned U.S. patent, the articles, when released from hooks 56' or 56", may drop onto a slick rail or may drop directly into a bin.

This application is a division of our application Serial No. 100,866, filed April 5, 1961, now U.S. Patent No. 3,118,531 issued January 21, 1964.

While we have shown and described the preferred embodiments of our invention, it will be understood that the invention may be embodied otherwise than as herein specifically illustrated or described, and that certain changes in the form and arrangement of parts and in the specific manner of practicing the invention may be made without departing from the underlying ideas or principles of this invention within the scope of the appended claims.

Having thus described out invention, what we claim and desire to secure by Letters Patent is:

1. Conveyor apparatus comprising, an endless rail, an endless article carrying chain mounted for circulatory movement on said rail and comprising an endless series of rigid links disposed in end-to-end relation and pivotally connected to each other at their respective adjacent ends for pivotal movement in vertical and horizontal planes, each link being disposed in a vertical plane, a plurality of said links each having a similar series of pivotally mounted article carrying hooks spaced from each other fixed distances apart, said hooks of each one of said plurality of links corresponding to the hooks of each one of the other links of said plurality of links, and a series of spaced article removing operating means, corresponding to each one of said series of article carrying hooks of said plurality of links, and positioned to be passed by said article carrying hooks as said chain moves around said rail, each of said article removing operating means being positioned relative to a corresponding one of said article carrying hooks of each one of said series of article carrying hooks for control by passage of said corresponding one article carrying hook to cause removal of the article carried by said corresponding one article carrying hook.

2. Conveyor apparatus as defined in claim 1, wherein said article removing operating means are mounted longitudinally spaced from each other and said article carrying hooks of each series are mounted longitudinally spaced from each other, and slick rail means associated with at least one of said article removing operating means, said slick rail means including means positioned with respect to said one corresponding article removing operating means for receiving and transporting articles, which are caused to be removed by the latter, to positions remote from said corresponding article removing operating means.

3. Conveyor apparatus as defined in claim 2, wherein said article carrying hooks of each series are mounted in longitudinal alignment with each other.

4. Conveyor apparatus as defined in claim 1, wherein said pivotally mounted article carrying hooks are movably mounted on the companion link between vertical article-carrying positions and inclined article-releasing positions.

5. Conveyor apparatus as defined in claim 4, wherein said pivotally mounted article carrying hooks are mounted at the same level and each hook has a laterally extending arm positioned at a level which is different from the levels of the extending arms of the other hooks of the companion series, and said series of article removing operating means are positioned at correspondingly different levels and in the path of movement of a corresponding arm for engagement by the latter to pivot the companion hook into article-releasing position.

6. Conveyor apparatus as defined in claim 4, wherein said pivotally mounted hooks of each series are mounted at the same level and each has a member laterally spaced from the companion hook a distance which is different from the lateral distances of the members of the other hooks of the companion series, and said series of article removing operating means are positioned at correspondingly different lateral distances and in the path of movement of a corresponding hook member for engagement by the latter to pivot the companion hook into article-releasing position.

7. Conveyor apparatus as defined in claim 5 wherein said hooks of each series are mounted in longitudinal alignment.

8. Conveyor apparatus as defined in claim 6, wherein said hooks of each series are mounted in longitudinal alignment.

9. Conveyor apparatus comprising, an endless rail having parts which are at levels that are higher than other parts of the rail, an endless article carrying chain comprising an endless series of rigid links disposed in end-to-end relation and pivotally connected to each other at their respective ends for pivotal movement in vertical and horizontal planes, means suspending said chain from said rail for movement of said chain below said rail, each of said links being disposed in a vertical plane, a plurality of said links each carrying a similar series of article carrying hooks spaced from each other fixed distances apart and each mounted for pivotal movement between an article-carrying position and an article-releasing position, said hooks of each series being in longitudinal alignment and at the same level during horizontal movement of the companion link of said chain and each hook having a hook-operating member laterally spaced from said hook a distance which is different from the lateral distances of the other hook-operating members from the other hooks of said series of hooks, said hook-operating members of said series of hooks being at the same level, said hooks of each one of said plurality of links corresponding to the hooks of each one of the other links of said plurality of links, and a series of spaced article removing operating means, corresponding to each one of said series of article carrying hooks of said plurality of links, and positioned adjacent to and laterally of said chain to be passed by said article carrying hooks as said chain moves around said hook rail to engage said operating member of the hook to pivot the latter from said article-carrying position to said article-releasing position for removal of the article, said article removing operating means of said series being spaced at different lateral distances from each other and from said chain and corresponding to the different lateral distances of said hook-operating members of the series for operating said hook-operating members.

References Cited in the file of this patent

UNITED STATES PATENTS

| | | |
|---|---|---|
| 386,314 | Green | July 17, 1888 |
| 1,247,535 | Huddleston | Nov. 20, 1917 |
| 1,556,723 | Shaffer | Oct. 13, 1925 |
| 1,731,095 | Draeger | Oct. 8, 1929 |
| 1,986,420 | Webb et al. | Jan. 1, 1935 |
| 2,897,951 | Jonson | Aug. 4, 1959 |

FOREIGN PATENTS

| | | |
|---|---|---|
| 1,131,860 | France | Oct. 1, 1956 |
| 791,276 | Great Britain | Feb. 26, 1958 |